INVENTOR
DENNIS JAMES MYNALL

United States Patent Office 3,002,104
Patented Sept. 26, 1961

3,002,104
POSITION SENSING DEVICES
Dennis James Mynall, Rugby, England, assignor to The British Thomson-Houston Company Limited, London, England, a British company
Filed May 27, 1959, Ser. No. 816,271
Claims priority, application Great Britain, June 4, 1958
10 Claims. (Cl. 307—43)

This invention relates to position sensing devices as used for sensing or detecting the instantaneous relative positions of two relatively movable parts, and has an important application in connection with the determination and/or control of the positioning of relatively movable parts of a machine tool.

Position sensing devices are known which depend for their operation on the mutual inductance existing between helical conductors which pass round closely spaced, facing, cylindrical surfaces on respective members movable with respect to each other lengthwise of the axis of the helices, the mutual inductance varying cyclically as a result of such relative movement of said members.

The present invention provides a device which involves a capacitive, rather than inductive, effect and which possesses certain advantages over the inductive devices as will be pointed out later.

According to the invention in its broadest aspect, a position sensing device comprising a first member having an inwardly or outwardly facing circumferential surface provided with at least one continuous, electrically conductive path passing round and progressing along the member in a manner analogous to that of a helix round a cylinder, together with a second member arranged for relative longitudinal movement with respect to the first member and defining a surface facing and substantially conforming to said surface of the first member over at least a portion of the circumference thereof, which second member is provided with at least three separate continuous conductive paths at least portions of each of which, located on said surface of the second member and substantially conforming in shape and spacing to corresponding portions from adjacent turns in said path on the first member, are disposed so as to have sensible electrical capacitance between them and the path on the first member, the arrangement being such that relative movement between the members in the said direction will produce cyclical variation of the capacitance between conductive paths on different members.

Where the first member, which is preferably but not necessarily cylindrical, has more than one electrically conductive path, the paths would pass round and progress along the member in a mutually interlaced manner analogous to that of a multiple-start helix round a cylindrical surface, the paths being electrically separate one from another.

As has been mentioned, the capacitive position sensing device of the invention has certain advantages over inductive devices. For instance the capacitive device absorbs much less, in fact almost negligible, electric power as compared with inductive devices which present appreciable resistance to an exciting source. Such virtual non-dissipation of power in the capacitive device is advantageous in that the design of the excitation circuits can be simpler, and in that local heating effects are avoided which, by causing differential expansion, could have an adverse effect on the accuracy of the device in circumstances where utmost accuracy is required. Moreover it has been found that precisely controlled voltages for the excitation of the capacitive device can be obtained from simpler circuits than those required for a corresponding inductive device.

In the inductive devices, eddy current effects must be considered and minimised since the current paths lie in the magnetic field. Such considerations do not arise with the capacitive device, because the conductive paths are required to form equipotential boundaries of the (electric) field. Consequently there is a greater freedom of choice as regards the material and form of the conductive paths in the capacitive device, thereby permitting the use of metals and manufacturing techniques which would not be suitable for the inductive devices. A further advantage is that the conductive paths of the inductive devices have to carry appreciable currents (for instance of the order of 0.1 to 1.0 amp.) whereas in the capacitive device the currents are negligible. It is therefore easier to make satisfactory, long-life, electrical connections.

Finally, with inductive devices there are likely to be significant stray capacitance effects which contribute to error, and care has to be taken to minimise these effects. In the capacitive device, the capacitance is not a "stray" quantity and there is no significant equivalent stray inductance effect.

In further considering the invention and the manner in which a position sensing device conforming thereto may be used, reference will be made to the accompanying drawings in which:

FIGS. 1 and 2 respectively illustrate possible forms of the first and second members, as above identified, of a position sensing device according to the invention, the second member being annular and being shown partly broken away with the first member removed;

Figure 1:
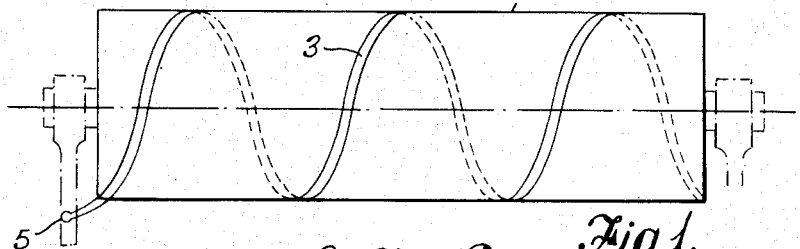
Figures 2, 3:
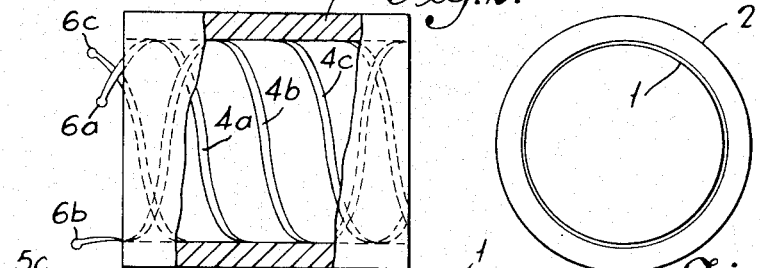
FIG. 3 is an end view showing the operational relationship between the two members shown separately in FIGS. 1 and 2.
Figure 4:
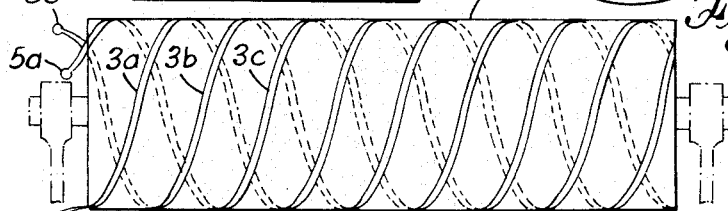
FIGS. 4 and 5 are generally similar to FIGS. 1 and 2 respectively but illustrate members having more than the minimum number of conducting paths.
Figure 5:
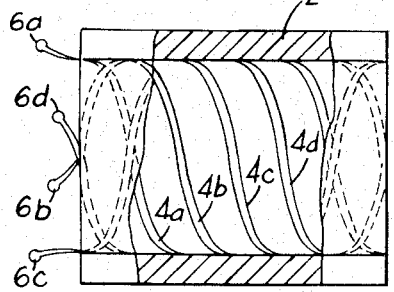

Referring now to FIGS. 1 to 7, a position sensing device embodying the invention may comprise a cylindrical first member 1 (FIG. 1 or 4) and an annular (FIG. 2 or 5) or arcuate (FIG. 6) second member 2 which in use is positioned to embrace the member 1 with a small clearance between them. This positional relationship is shown in FIG. 3 for an annular second member and FIG. 7 for an arcuate second member. The first member 1 is provided on its cylindrical surface with an electrically conductive helical path 3 (FIG. 1) or a number of interlaced electrically conductive helical paths 3a, 3b, 3c (FIG. 4). The second member 2 is provided with three or more similar paths which in FIGS. 2 and 5 are constituted by interlaced helices 4a, 4b . . . on the inner surface of member 2, and in FIG. 6 include, on the inner surface of the member 2, paths 4a', 4b' . . . which are parts of interlaced helices, the electrical connection of parts of individual helices being completed by paths 4a", 4b" . . . respectively, extending over the outer cylindrical surface of the member 2. Each of the helical paths 4a, 4b . . . (FIGS. 2 and 5) or the part-helical paths 4a', 4b' . . . (FIG. 6) has the same or substantially the same mechanical lead and is of the same hand as the helix 3 (FIG. 1) or helices 3a, 3b . . . (FIG. 4) on the member 1. The mechanical lead of the helices is considerably exaggerated in the drawing.

Figures 6, 7:
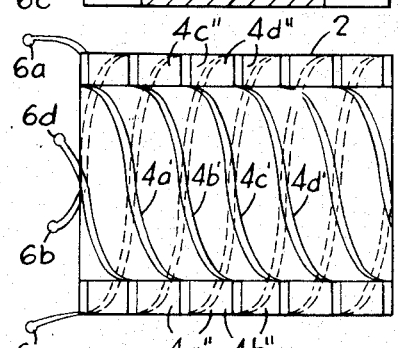
FIG. 6 illustrates a semi-annular form for the second member of the device.
FIG. 7 is an end view showing the operational relationship of such semi-annular form of second member with the first member.

In using the position sensing device the members 1 and 2 occupy the positional relationship illustrated in FIG. 3 or 7 as the case may be (in which relationship capacitive couplings exist between the path 3 or paths 3a, 3b ... on the member 1 and the paths 4a, 4b ... or 4a', 4b' ... on the member 2) and are arranged for relative longitudinal movement, that is, lengthwise of the axis of the cylindrical member 1. Electrical connections (not shown) are made to terminal 5 (FIG. 1) or terminals 5a, 5b ... (FIG. 4) (which may themselves be connected conveniently but not necessarily to the ends of the helices) on member 1 and also to terminals 6a, 6b ... (FIGS. 2, 5 and 6) on member 2.

As relative longitudinal movement takes place between the members 1 and 2, a cyclical variation of the capacitances between the path or paths 3 and the paths 4 will be obtained and may be utilised for the purpose of position sensing as follows.

Application to terminals 6 on element 2 of voltages varying in the same way with respect to time, that is, having similar waveforms, but in general having different relative magnitudes (including negative values), may be used to set up an electric field influencing the path or paths on element 1. It will be understood by those versed in the art that by appropriate control of the relative magnitudes of the applied voltages the electric field may be kept at all times similar in form but moved to any desired axial position. More explicitly, if there are, for example, $n$ similar, interlaced helical conductors on member 2 and the axial spacing between helices is uniform, then simultaneous application to successive helices of similar voltages having magnitudes relatively and respectively proportional to $\sin \theta$, $\sin (\theta + 2\pi/n)$, $\sin (\theta + 4\pi/n)$ ... $\sin \{\theta + (n-1)2\pi/n\}$ will result in an electric field which has substantially the same form for any value of $\theta$ but which takes up different axial positions along member 2 for different values of $\theta$ within the range zero to $2\pi$ radians. Furthermore, the axial change of position of the field consequent upon a change of $\theta$ is substantially proportional to the amount of that change: a change in $\theta$ of $2\pi$ radians results in a change of axial position of the field equal to the mechanical lead of the helical system. The smallest number of separate helices 4 necessary to give the effect described is three (FIG. 2) but it may be preferred to make $n$ greater than three (FIGS. 5 and 6) if this is more suitable to an available voltage source or will minimise the amount of apparatus required to generate the required voltages from a given physical representation of $\theta$.

The open circuit voltage at terminal 5 of member 1 (FIG. 1) resulting from a fixed excitation of member 2 (i.e. $\theta$ being constant) will vary cyclically with uniform relative longitudinal movement of the elements, changing from a maximum in one sense to a maximum in the opposite sense and back to a maximum in the first sense as relative movement between the two members goes through a distance equal the pitch of the helix on member 1. There are two positions in one cycle of change of output where the output is zero; either of these may be sensed by suitable electrical null-detecting apparatus and considered to define the relative position indicated by any particular value of the input $\theta$: it is evident that if $\theta$ be changed then the null will be detected at a correspondingly changed relative position.

While one helix only on member 1 will suffice for the detection of the relative position corresponding to an electrical input to member 2, it may be preferred to use more than one helix on member 1. For example, if two helices symmetrically interlaced be used (not illustrated) then the relative position sought may be defined by zero difference of the voltages appearing on the helices; the benefit gained by this arrangement would be that electrical interference picked up by both helices from a source external to the apparatus is eliminated from the null output or is at least substantially reduced in value relative to the desired signal. It is not essential that the two pick-up helices be symmetrically interlaced; a particular form of member 1 which has been used successfully is illustrated diagrammatically in FIG. 4, where the difference voltage is detected between any chosen pair of helices 3 and the third helix is maintained at zero potential: in this form of element 1 it is possible to use a circuit which detects the average voltage of the null-detecting pair of helices with respect to the potential of the third helix and so obtain a measure of the sensitivity of the system (electrical output per unit longitudinal displacement from null position), this measure being available to control the overall sensitivity of the whole system if so desired.

Another way of using the device of the invention would be to apply sinusoidal voltages of constant magnitude but of different phasing to the helices of member 2, so generating an electric field which moves continuously in an axial direction and thus gives a sinusoidal output from the helix or helices on member 1 which is constant in magnitude but which varies substantially uniformly in phase with uniform relative longitudinal movement of members 1 and 2; the phase of the output relative to the fixed phases of the input may be used to sense the relative position of the members. The previous discussion regarding the various numbers of helices which may be employed on either member applies also to the system employing phase-sensing.

Where practicable, it is preferred to use an annular form of member 2 such as that shown in FIG. 2 or FIG 5, since then the full peripheral length of the turns in the path or paths 3 on the member 1 is used in providing coupling between these paths and the paths 4 on the member 2. With the member 2 completely surrounding the member 1, however, the latter could be supported permanently only adjacent its ends. Should it be desired to avoid this limitation, there may be used instead, for the member 2, an arcuate, preferably semi-annular, form such as that of FIG. 6.

In the embodiments illustrated the first member 1 of the sensing device has been shown as being rectilinear with its peripheral surface cylindrical, so that its conductor paths 12 and 13 are helical and thereby define a single or multi-start helix the axis of which is parallel to the direction of relative movement (linear) between the two members. It is also possible, however, for the first member to have some other cross-section such for instance as oval or even rectangular. Moreover it is contemplated that a device in accordance with the present invention could be employed for sensing angular displacement, rather than linear displacement if the first member 1, instead of being rectilinear were made curved or in the limit annular. In all cases the shape of the second member (2) of the device would be adapted to suit that chosen for the first member.

An advantage of the first member being rectilinear and cylindrical is that by arranging the two members such as 1 and 2 for relative angular rotation about the cylinder axis as well as for relative linear movement along the axis, the device becomes capable of responding also to relative angular displacement. This may be useful for instance in controlling small rectilinear movements from relatively large annular movements, or in applying corrections or deliberate distortions to the law by which the input quantity ($\theta$) is related with the linear displacement, such corrections or distortions being applied by introducing a predetermined extent of rotary motion derived from the linear motion as by cam control or other means (not shown). With the members thus arranged for relative rotation about the cylinder axis, which is also the axis of the helical paths on the first member, one complete revolution will correspond to a change in relative linear movement equal to the lead of the helix or helices on member 1.

Whereas a device conforming to the invention has been illustrated as having its first member 1 of cylindrical form with its conductive paths on its outside surface, it is to be understood that the first member of the device could have a hollow form with its conductive path or paths provided on an inside peripheral surface. The second member of the device would then be accommodated within the first member and be provided with its conductive paths on an outwardly facing surface. Further, whereas member 2 has been illustrated as relatively short compared with member 1, this relationship of lengths may be reversed.

In carrying out the invention the parts of the two members of the position sensing device which support the conducting paths may be made substantially completely of insulating material, or may consist of insulating material which provides the surfaces carrying the conducting paths and is combined with or bonded to metallic members for the purpose of providing mechanical strength, support, and/or electrical screening. The conductive paths may be provided on the members in any convenient way. For instance they may be "printed" on to the members or may take the form of conductive strips suitably wrapped round them. Again, the paths may be machined from a conductive coating which initially completely covers the insulating support, or the surfaces may be grooved in accordance with the desired form of the paths and conductors laid or formed therein, in which case, the conductors may, if desired, be embedded in a material filling up the grooves thereby to provide a smooth surface on the member concerned.

In employing a device in accordance with the invention for providing electrical indication and/or control of the relative positions of, say, two relatively rectilinearly movable parts of a machine tool, the longer member, being rectilinear and having a length at least great enough to allow maximum relative displacement between the machine tool parts without losing the capacitive coupling between the members of the device, would be attached to one of the parts with its axis parallel to the direction of movement, while the shorter member would be attached or mechanically coupled to the other part in such position as to ensure the required capacitive coupling between the conductive paths of the members throughout the relative movement of the machine tool parts.

Since the capacitance would go through several cycles of variation in a total travel of the machine tool parts, some form of coarse indication or control may have to be provided to determine when the relative positions of the parts lie within a particular range, the device of the invention then determining more precisely the relative positions of the parts within that range. It will be appreciated, however, from analogy with conventional synchro systems, that where the indication or control is continuous no such coarse indication or control may be necessary.

What I claim is:

1. A position sensing device comprising a first member having a circumferential surface provided with at least one continuous, electrically conductive path passing round and progressing along the member in a manner analogous to that of a helix round a cylinder, together with a second member arranged for relative longitudinal movement with respect to the first member and defining a surface facing and substantially conforming to said surface of the first member over at least a portion of the circumference thereof, which second member is provided with at least three separate continuous conductive paths at least portions of each of which, located on said surface of the second member and substantially conforming in shape and spacing to corresponding portions from adjacent turns in said path on the first member, are disposed so as to have sensible electrical capacitance between them and the path on the first member, the arrangement being such that relative movement between the members in the said direction will produce cyclical variation of the capacitance between conductive paths on different members.

2. A position sensing device as claimed in claim 1 wherein said first member has a plurality of conductive paths which pass round and progress along the member in a mutually interlaced manner analogous to that of a multiple-start helix round a cylinder.

3. A position sensing device as claimed in claim 1 wherein said circumferential surface of the first member is cylindrical and its conductive path or paths helical.

4. A position sensing device as claimed in claim 1, wherein said surface on the second member conforms to that on the first member round the entire circumference of the latter and the conductive paths on the second member extend round the surface in a mutually interlaced manner analogous to that of a multiple-start helix round a cylinder.

5. A position sensing device as claimed in claim 1 wehrein the surface of the second member conforms to the circumferential surface of the first member over only part of the circumference of the latter, and each conductive path on the second member comprises serially connected portions substantially conforming in shape and spacing to those portions of the path or paths on the first member which extend over said part of its circumference.

6. A position sensing device as claimed in claim 5 wherein said portions of each path are connected in series by connections taken over the rear of the second member between one end of each such portion and the opposite end of the next portion belonging to the same conductive path.

7. A position sensing device as claimed in claim 1 wherein said second member has $n$ conductive paths ($n$ being not less than three) to which are applied respective voltages having similar waveforms and magnitudes respectively proportional to $\sin \theta$, $\sin (\theta + 2\pi/n)$, $\sin (\theta + 4\pi/n) \ldots \sin (\theta + (n-1)2\pi/n)$, where $\theta$ is a variable angle equal changes of which correspond to equal changes of position to be sensed.

8. A position sensing device as claimed in claim 1 wherein the conductive paths of the second member have applied to them respective sinusoidal votlages of constant magnitude but of different phasing such as to generate an electric field moving continuously in the longitudinal direction of the member.

9. A position sensing device as claimed in claim 7 wherein the first member has three mutually interlaced conductive paths one of which is maintained at zero potential.

10. A position sensing device as claimed in claim 8 wherein the first member has three mutually interlaced conductive paths one of which is maintained at zero potential.

References Cited in the file of this patent

UNITED STATES PATENTS

| | | |
|---|---|---|
| 1,610,122 | Edenburg | Dec. 7, 1926 |
| 2,147,728 | Wintringham | Feb. 21, 1939 |
| 2,611,964 | Buisson | Sept. 30, 1952 |
| 2,638,578 | Piety | May 12, 1953 |